(12) United States Patent
Philbeck et al.

(10) Patent No.: US 10,570,289 B2
(45) Date of Patent: Feb. 25, 2020

(54) METHODS AND APPARATUSES FOR APPLYING ACTIVATED PRIMER TO A SUBSTRATE SURFACE

(71) Applicant: The Boeing Company, Chicago, IL (US)

(72) Inventors: Warren D Philbeck, Summerville, SC (US); Rodney J Washington, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/056,605

(22) Filed: Aug. 7, 2018

(65) Prior Publication Data

US 2018/0340076 A1  Nov. 29, 2018

Related U.S. Application Data

(63) Continuation of application No. 14/988,907, filed on Jan. 6, 2016, now Pat. No. 10,072,157.

(51) Int. Cl.
| | | |
|---|---|---|
| *C09D 5/00* | (2006.01) | |
| *B05D 1/28* | (2006.01) | |
| *B05C 17/005* | (2006.01) | |
| *C09D 5/08* | (2006.01) | |

(52) U.S. Cl.
CPC ............ *C09D 5/002* (2013.01); *B05C 17/005* (2013.01); *B05D 1/28* (2013.01); *C09D 5/08* (2013.01)

(58) Field of Classification Search
None
See application file for complete search history.

(56) References Cited

U.S. PATENT DOCUMENTS

| | | |
|---|---|---|
| 6,913,593 B1 | 7/2005 | Alexandre et al. |
| 2003/0153091 A1 | 8/2003 | Willard et al. |
| 2005/0008787 A1* | 1/2005 | O'Neil ................ B05C 17/0207 427/428.01 |
| 2005/0209555 A1 | 9/2005 | Middleton et al. |
| 2006/0198951 A1* | 9/2006 | Tang ................. B05C 17/00553 427/140 |
| 2007/0231156 A1 | 10/2007 | Hong |
| 2011/0189402 A1 | 8/2011 | Wagner |
| 2013/0197451 A1* | 8/2013 | Ishii .................. A61M 5/31513 604/221 |
| 2013/0209717 A1 | 8/2013 | Edwards et al. |
| 2016/0257819 A1* | 9/2016 | Pathak ................... C09D 5/002 |

* cited by examiner

*Primary Examiner* — John J Figueroa
(74) *Attorney, Agent, or Firm* — Coats & Bennett, PLLC (57) ABSTRACT

Methods and apparatuses are disclosed relating to the delivery of primer compounds in liquid form to substrates from a hand-held device. Apparatuses are disclosed that, in a single barrel device, store primer components, mix primer components to achieve an activated primer, and deliver the activated primer to a substrate surface.

20 Claims, 9 Drawing Sheets

METHODS AND APPARATUSES FOR APPLYING ACTIVATED PRIMER TO A SUBSTRATE SURFACE

This application is a continuation of prior U.S. patent application Ser. No. 14/988,907, filed 6 Jan. 2016, now U.S. Pat. No. 10,072,157 issued 11 Sep. 2018, the disclosures of which are incorporated by reference herein in their entirety.

TECHNOLOGICAL FIELD

The present disclosure generally relates to the field of applying primer to substrates. More particularly, the present disclosure relates to the field of hand-held apparatuses and hand-held applicators for applying primer to substrates.

BACKGROUND

In the manufacturing field, various coatings, including, for example, paints and/or primers, are applied to parts, each having different dimensions. Either during fabrication, or during repair and/or retrofitting, coated, painted or primed surfaces on various parts are touched up with paint or primer. When primers are employed, such primers may include multi-component materials retained in separate containers that are combined before the primer is activated for use and is then ready for application onto a part. Known methods therefore employ at least a two-part primer system, whereby components are mixed just prior to application. Such combining of materials leads to making a batch or volume of available activated primer, often without knowing the actual volume of primer that will be needed. Such conventional primer coating protocol may result in significant waste of primer. In addition, it is time consuming and inefficient for technicians to take the time to transport, handle and mix the primer components in a manufacturing setting. Further, since the primer components often contain volatiles, the fumes which emanate therefrom can implicate additional safety requirements, further adding to the potential complexity, efficiency and overall cost for a priming procedure.

In addition, once a plurality of components has been combined to produce an activated primer, the primer is manually applied to a region of a substrate surface with a fair degree of precision. Such application during "touch-up" or other priming procedures is often accomplished with a brush that then either needs to be cleaned after use or that is simply discarded, further increasing the overall complexity, time and resulting expense of the priming procedure.

BRIEF SUMMARY

The present disclosure relates to methods and apparatuses for applying primer to a substrate from a hand-held apparatus.

According to one aspect of the disclosure, methods are disclosed for delivering a flow of activated primer to a substrate surface using a single barrel device having a first chamber and a second chamber with a seal disposed between the first and second chambers, the first chamber and the second chamber positioned adjacent the seal, wherein an amount of a primer component is in the first chamber and an amount of a primer activator is in the second chamber, with the method comprising: engaging a movable seal piercing component; piercing the first seal with the movable seal piercing component; mixing the primer component and the primer activator to activate the primer component and produce an activated primer; contacting an integral dispensing component to a substrate surface, with the integral dispensing component in communication with the activated primer, wherein the integral dispensing component receives an amount of the activated primer; and delivering an amount of the activated primer to the substrate surface.

In another aspect, a method further comprises the step of positioning the first chamber and the second chamber linearly with respect to one another within the single barrel device.

In a further aspect, in the step of mixing the primer component and the primer activator, the primer activator comprises a compound including, strontium chromate, butyl alcohol, acetone, deionized water and combinations thereof with the primer component.

In yet a further aspect, in the step of mixing the primer component and the primer activator, the primer component comprises a compound including titanium dioxide, quartz, barium chromate, rutile, talc, bisphenol A diglycidal ether polymer, formaldehyde pmr with bis(aminoethyl) ethanediamine and phenol, unsaturated C18 fatty acids/tall oil acids/ triethylenetetramine, or combinations thereof with the primer activator.

In yet another aspect, the integral dispensing component comprises a wicking component, and wherein delivering a predetermined amount of the activated primer comprises delivering the activated primer to the substrate surface via the wicking component.

According to a further aspect, a primer applicator is disclosed comprising: a body comprising a single barrel, said single barrel comprising a first chamber comprising an amount of primer component; a second chamber comprising an amount of primer activator, with the second chamber positioned linearly adjacent to the first chamber; a chamber seal with the first chamber and second chamber positioned adjacent to the chamber seal; a means for rupturing the seal to produce activated primer; and a means for dispensing activated primer to a surface. The body may be a substantially tubular body.

In a still further aspect, the means for rupturing the seal comprises a component movable with respect to the body and/or movable with respect to the seal. The first and second chambers and/or the seal may be movable with respect to the means for rupturing the seal.

In another aspect, the means for dispensing activated primer to a surface comprises a wicking component.

In yet another aspect, the applicator comprises an ergonomic grip.

In still another aspect, the applicator stores and mixes primer in the single barrel.

In a still further aspect, the applicator dispenses activated primer from the applicator directly to a substrate surface.

In yet another aspect, activated primer is activated by providing a single barrel device having a first chamber and a second chamber, the first chamber including a seal and the second chamber positioned linearly adjacent the seal of the first chamber, wherein an amount of a primer component is in the first chamber and an amount of a primer activator is in the second chamber, with the method comprising: engaging a movable seal piercing component; piercing the seal with the seal piercing component; mixing the primer component and the primer activator to activate the primer component and produce an activated primer; contacting an integral dispensing component to a substrate comprising a substrate surface, with the integral dispensing component in communication with the activated primer, wherein the dispensing component receives an amount of the activated primer; and delivering an amount of the activated primer to the substrate surface.

According to another aspect, the substrate is a vehicle.

In yet another aspect, the substrate is a stationary object comprising a stationary substrate surface.

In yet another aspect, the vehicle is selected from the group including a manned aircraft, an unmanned aircraft, a manned spacecraft, an unmanned spacecraft, a manned rotorcraft, an unmanned rotorcraft, a rocket, a manned satellite, an unmanned satellite, a manned terrestrial vehicle, an unmanned terrestrial vehicle, a manned surface and/or subsurface waterborne vehicle, an unmanned surface and/or subsurface waterborne vehicle and combinations thereof.

In a further aspect, methods are disclosed for delivering a flow of activated primer to a substrate surface using a single barrel device having a first chamber and a second chamber with a seal positioned between the first chamber and second chamber, the first chamber and the second chamber positioned adjacent the seal, wherein an amount of a primer component is in the first chamber and an amount of a primer activator is in the second chamber, with the method comprising: providing force to the seal; rupturing the seal; mixing the primer component and the primer activator to activate the primer component and produce an activated primer; contacting an integral dispensing component to a substrate surface, with the integral dispensing component in communication with the activated primer, wherein the integral dispensing component receives an amount of the activated primer; and delivering an amount of the activated primer to the substrate surface.

In yet another aspect, the step of rupturing the seal comprises rupturing a frangible region of the seal.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Aspects of the present disclosure are directed to methods and apparatuses for the delivery of activated primer compounds to a substrate surface. More particularly, aspects of the present disclosure are directed to apparatuses that, in a single barrel device, store primer components, mix primer components to achieve an activated primer, and deliver the activated primer directly to a substrate surface, and optionally store unused activated primer. Accordingly, improved and cost-effective methods and apparatuses for storing, transporting, activating and applying a primer to a substrate surface are provided herein.

Figure 1:
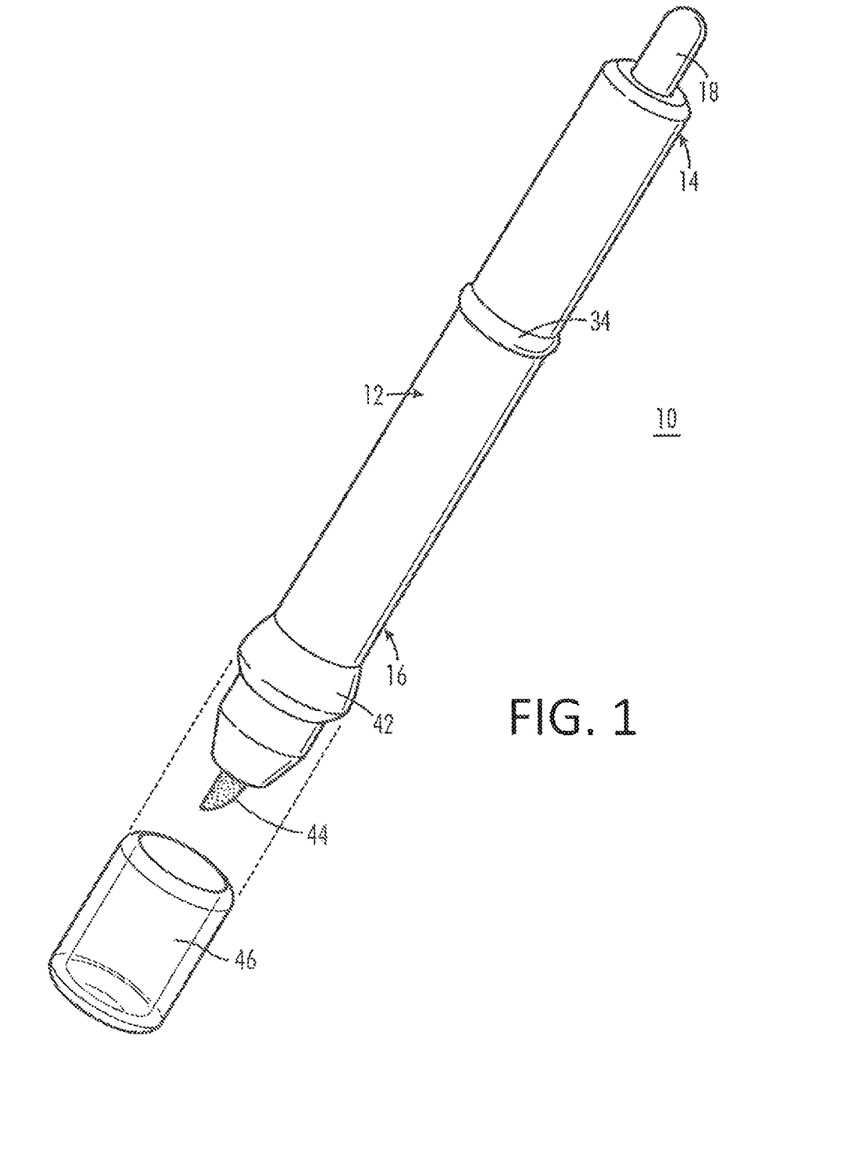
FIG. 1 is perspective view of a primer applicator device.

FIG. 1 shows a perspective view of a primer applicator device according to an aspect of the present disclosure. Applicator device 10 is shown having a body section 12 extending from a first end 14 toward a second end 16. A movable seal piercing component 28 (shown in FIGS. 2A-2C) is in communication with a push button 18 that extends from first end 14. Flange 34 represents an optional external feature approximating the location of a chamber seal 32 existing within the device, and that is shown in more detail in FIGS. 2A-2C. A device grip 42 is shown located at a distance from second end 16. Dispensing component 44 extends a distance from second end 16, with optional cap 46 shown to be dimensioned to engage with device body 12, and when in an engaged position, covers second end 16 and dispensing component 44.

Figure 2A:
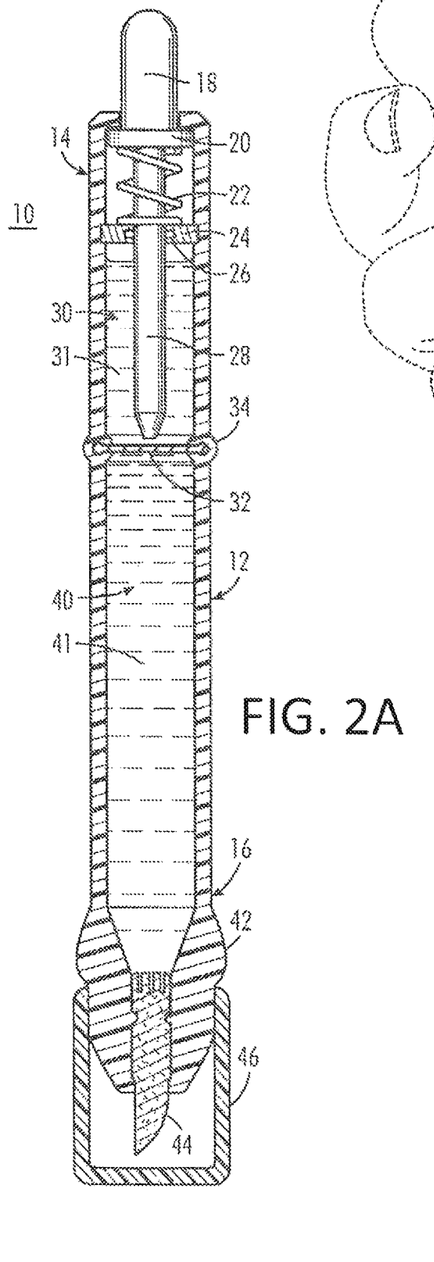
FIGS. 2A-2C are a cross-sectional views of a primer applicator device.
Figure 2B:
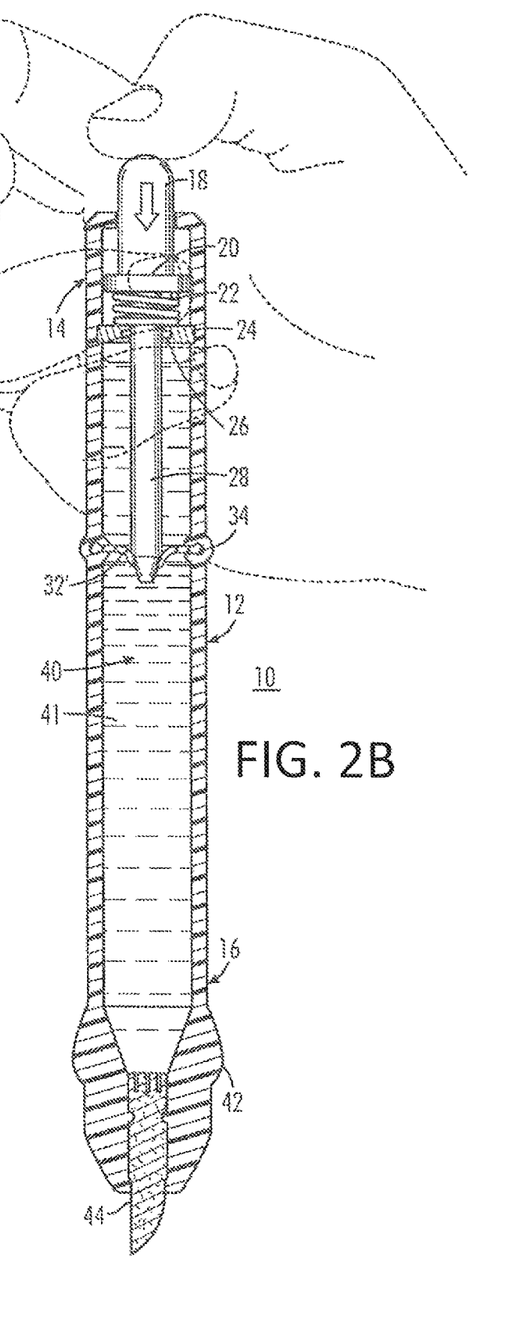
Figure 2C:
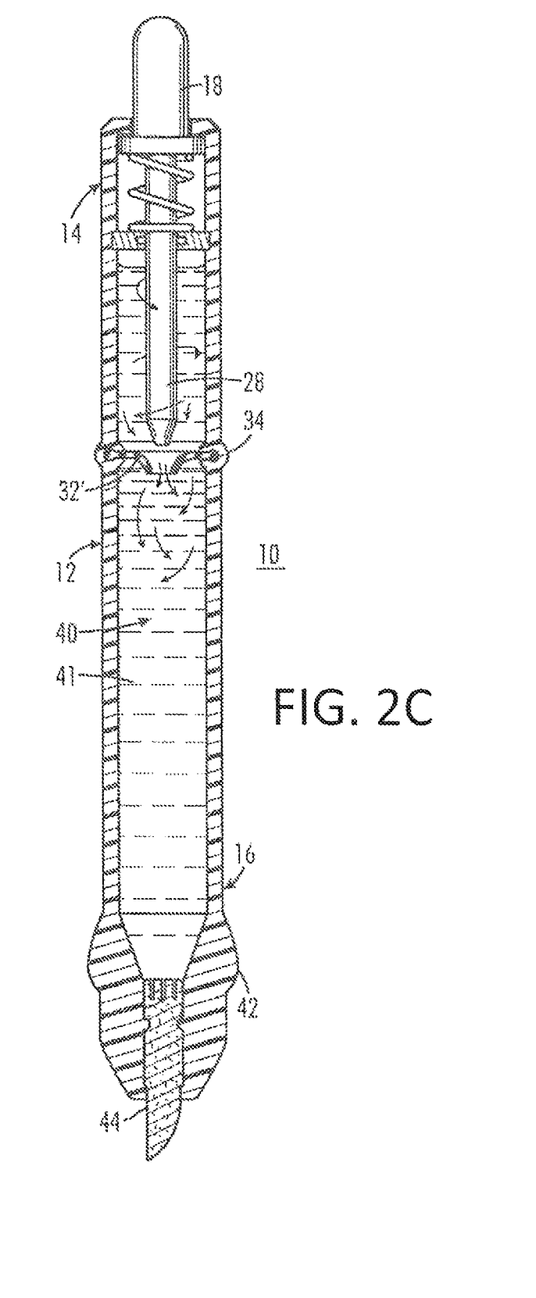

FIGS. 2A and 2B are cross-sectional side views of the primer applicator device 10 of FIG. 1. As shown, primer applicator device 10 comprises a first end 14 comprising a first chamber 30 containing an amount of primer activator 31. Depressible push button 18 is in communication with spring 22 and push pin 28. Push pin 28 has a distal end relative to the push button 18 that is configured to puncture chamber seal 32. Push pin 28 is shown movably nested within an opening 26 in spring flange 24. Second chamber 40 contains an amount of primer component 41. Dispensing component 44 is shown in communication with the second chamber 41, with dispensing component 44 preferably comprising a wicking material. Cap 46 is shown in an engaged position with body section 12. As shown in FIG. 2B, when the depressible push button 18 is depressed, such as by manual force, spring 22 is compressed and push pin 28 contacts and is then forced through chamber seal 32. As shown in FIG. 2C, as pressure on the depressible push button 18 is released, the push pin 28 is returned to its original position as spring 22 extends to its original length. The now punctured chamber seal 32 allows a flow of material, and a commingling of the contents of the first chamber 30 with the contents of the second chamber 40 occurs. According to an aspect as shown in FIG. 2C, the amount of primer activator 31 contained in first chamber 30 is commingled with the amount of primer component 41 in the second chamber 40 to produce an activated primer. As the contents of the applicator device 10 are substantially commingled or mixed, the mixed contents will substantially uniformly comprise activated primer as the primer activator 31 reacts with the primer component 41 to form activated primer.

Figure 3:
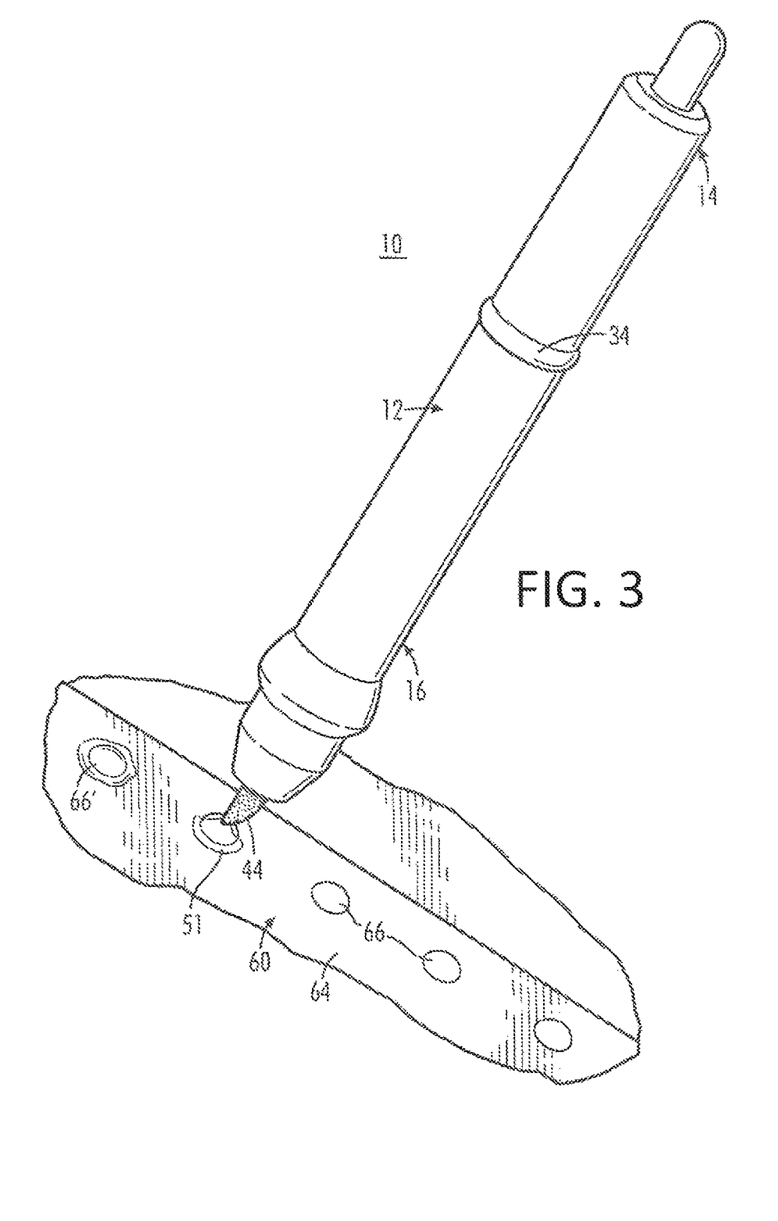
FIG. 3 is a perspective view of a primer applicator dispensing primer to a substrate surface.

FIG. 3 shows the primer applicator device 10 brought into contact with a substrate 60 having a substrate surface 64. Dispensing component 44 is shown in contact with a rivet 66 on substrate surface 64, with the dispensing component 44 dispensing a desired amount of activated primer 51 directly to rivet 66 in a predetermined and controlled fashion.

Figure 4A:
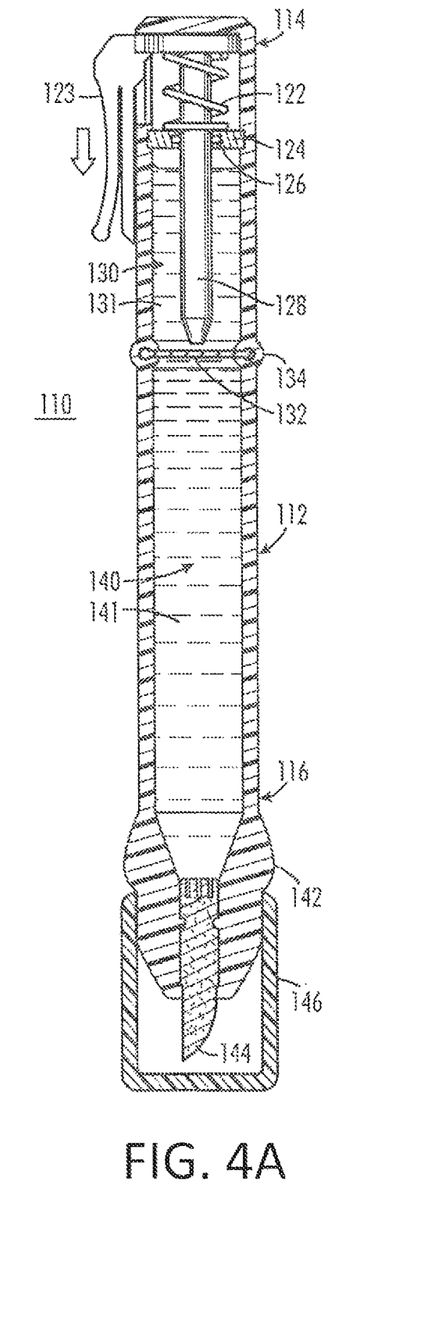
FIGS. 4A and 4B are cross-sectional views of an alternate aspect for a primer applicator.
Figure 4B:
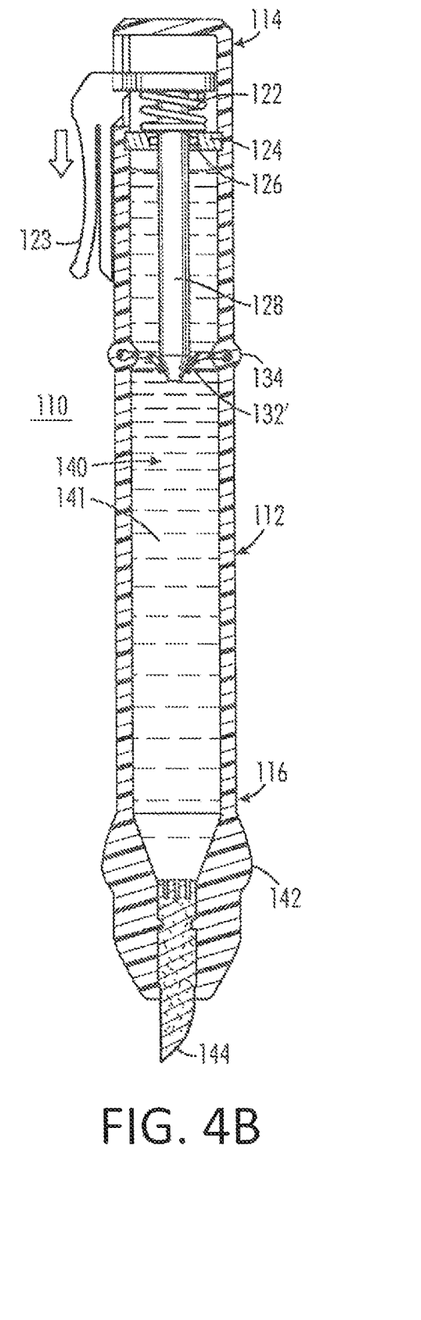

FIGS. 4A-4C show a further contemplated variation comprising an alternate mechanism for depressing a push pin through a chamber seal in a primer applicator device. As shown in FIGS. 4A-4C, primer applicator device 110 comprises a first end 114 comprising a first chamber 130 containing an amount of primer activator 131. Depressible push button 123 is in communication with spring 122 and push pin 128. Push pin 128 has a distal end relative to the push button 123 that is configured to puncture chamber seal 132. Push button 123 is shown movably nested within an opening 126 in spring flange 124. Second chamber 140 contains an amount of primer component 141. Dispensing component 44 is shown in communication with the second chamber 140, with dispensing component 144 preferably comprising a wicking material. Cap 146 is shown in an engaged position with body section 112. As shown in FIG. 4B, when the push button 123 is pressed, such as by manual force, spring 122 is compressed and push pin 128 contacts and is then forced through chamber seal 132. Though not shown in the Figures, as pressure on the depressible push button 123 is released, the push pin 128 is returned to its original position at a distance away from chamber barrier or seal 132. The now punctured chamber seal 132 allows a flow of material, and a commingling of the contents of the first chamber 130 with the contents of the second chamber 140. According to an aspect as shown, the amount of primer activator 131 contained in first chamber 130 is commingled with the amount of primer component 141 in the second chamber 141 to produce an activated primer. As the contents of the applicator device 110 are substantially commingled or mixed, the mixed contents will substantially uniformly comprise activated primer, as the primer activator 131 reacts with the primer component 141 to form activated primer.

Figure 5A:
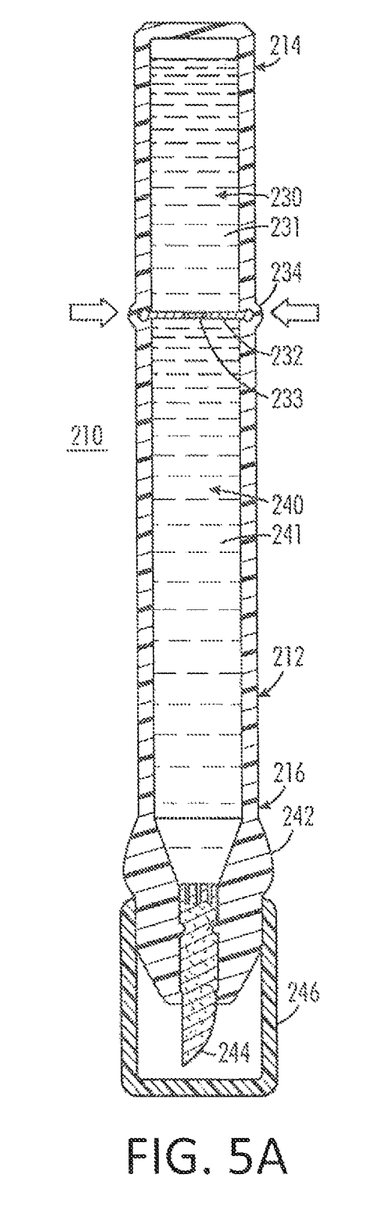
FIG. 5A is a cross-sectional view of an alternate aspect of a primer applicator.
Figure 5B:
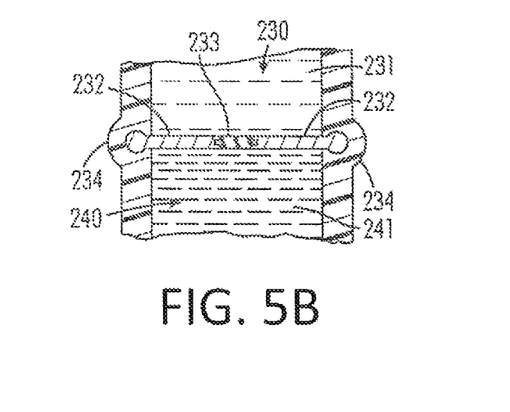
FIGS. 5B-5D are enlarged cross-sectional side vies of the primer applicator of FIG. 5A.
Figure 5C:
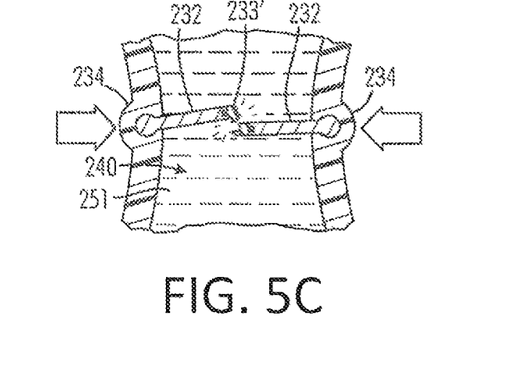
Figure 5D:
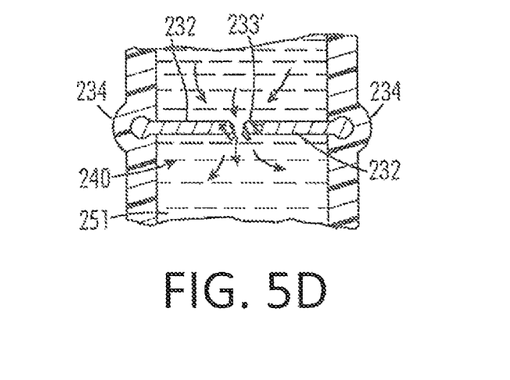

FIGS. 5A-5D are directed to a further alternate aspect of a contemplated activated primer applicator. FIG. 5A shows primer applicator device 210 comprising a body section 212 having a first end 214 comprising a first chamber 230 containing an amount of primer activator 231. Second chamber 240 contains an amount of primer component 241. Dispensing component 44, 244, located at the second end 216 of the body section 212, is shown in communication with the second chamber 240, with dispensing tip 244 preferably comprising a wicking material. Cap 246 is shown in an engaged position with body section 212. Flange 234 is in communication with chamber seal 232 that comprises frangible barrier section 233. FIGS. 5B-5D are close-up cross-sectional views of the chamber seal 232. As shown in FIG. 5C, when inward lateral force is applied to the sides of the body section 212 at or near flange 234, such as by manual force, the chamber seal 232 ruptures at or near frangible barrier section 233. The now punctured chamber seal 232 allows a flow of material, and a commingling of the contents of the first chamber 230 with the contents of the second chamber 240. According to an aspect as shown, the amount of primer activator 231 contained in first chamber 230 is commingled with the amount of primer component 241 located in the second chamber 240 to produce an activated primer. As the contents of the applicator device 210 are substantially commingled or mixed, the mixed contents will substantially uniformly comprise activated primer 251 (as shown in FIGS. 5C and 5D), as the primer activator 231 reacts with the primer component 241 to form activated primer 251.

The contents of the chambers in the applicators contemplated by the present disclosure may vary in terms of their orientation relative to one another. In other words, the primer component may be contained in a chamber located above or below the chamber containing the primer activator or vice versa as desired. As would be readily understood by one skilled in the field, the present disclosure contemplates the use of at least a two-part primer system comprising at least a primer component and a primer activator. Contemplated primer components include, without limitation, Type I Class A Corrosion Inhibiting Primer, Type II, Class A or B Epoxy Topcoat, and combinations thereof. Further contemplated primer component comprises a compound including titanium dioxide, quartz, barium chromate, rutile, talc, bisphenol A diglycidal ether polymer, formaldehyde pmr with bis(aminoethyl) ethanediamine and phenol, unsaturated C18 fatty acids/tall oil acids/triethylenetetramine, or combinations thereof.

Primer activators contemplated by the present disclosure include, without limitation, strontium chromate, butyl alcohol, acetone, deionized water, etc., and combinations thereof.

The applicators of the present disclosure are made from any suitable material able to contain primer components, primer activators and activated primer compositions. Such applicator materials include, without limitation, SPI Code 2 high density polyethylene, etc.

In addition, various combinations of materials may be used to make the applicators disclosed herein. For example, the spring, and other components contained within the applicator may be made from metallic and non-metallic materials. Further, the grip located at the second end of the body segment of the applicator may be made from any suitable material including, without limitation, plastics, rubberized, plastics, synthetic or natural rubber, etc. and combinations thereof.

The positioning of the chambers within the applicators contemplated by the present disclosure includes the chambers oriented relative to one another in a substantially linear orientation. In this way, the chambers are oriented such that the multiple (at least first and second) chambers are positioned and oriented within a single barrel applicator. The single barrel applicator can be substantially tubular, with the single barrel applicator having a substantially circular cross-section transverse to its lengthwise direction. According to further aspects, the cross-section may be of a geometric shape other than substantially circular including without limitation, rectangular, elliptical, rhombic, or irregular shapes as desired. Further, according to an aspect of the present disclosure, the overall width of the applicator along the body of its length is substantially equivalent to the outer diameter of the first and/or second chamber.

The present disclosure contemplates variations whereby more than two chambers are oriented linearly within a single barrel applicator. For example, a single barrel application may contain more than one primer components, and/or more than one primer activator. Therefore, the present disclosure also contemplates such variations, so long as each component/activator is contained within its own chamber bound by a penetrable chamber seal or chamber wall, and so long as a puncturing/piercing element (or rupturing force) can effectively puncture (or rupture) each seal, with the primer components and primer activators able to combine into an activated primer compound.

The seal piercing/puncturing component as shown in FIGS. 2A-2C and 4A-B are for illustrative purposes only; i.e. any piercing/puncturing component or mechanism that acts in response to a force provided to a part in communication with the piercing/puncturing component or mechanism is contemplated by the present disclosure.

Though not illustrated in the FIGs., aspects of the present disclosure further contemplate a single barrel applicator for dispensing activated primer wherein at least one primer component and at least one primer activator are each contained in a container or chamber within the single barrel applicator. Each container or chamber has a seal or shares a common seal. According to additional variations, the present disclosure contemplates such applicator to release its contents from its container by rupturing the various seals and allowing the content of each container/chamber to mix, wherein the seals are ruptured by a means other than the physical penetration or puncturing of the various seals via a puncturing or penetrating device. Seal rupturing method include, without limitation, providing an adequate force to the single barrel application such as, for example by shaking the single-barrel applicator, striking the single barrel applicator, providing a sonic vibration to the single barrel applicator, etc., such that the seals predictably rupture when a predetermined amount of force is provided.

Aspects of the present disclosure further contemplate a single barrel applicator 80 shown in FIGS. 8A, 8B, 8C, 8D, and 8E having a first and second chamber, or a single chamber 81 dimensioned to receive one 82 or more cartridges 83, 84, with the cartridges containing a primer component 85 and a primer activator 86 with a seal or barrier 87 disposed between the components of a single cartridge 82, or a seal 87 disposed between multiple cartridges 83, 84. In this variation, the cartridge or cartridges may be loaded into the applicator body, such that the applicator body may be reused by replacing the cartridges.

The material to be used for the container/chamber seal may be any material that can be successfully breached through piercing or puncturing when a puncturing or piercing element is responsible for such seal breaching. Such materials include, without limitation, materials that will not react with or that will be coated with a material that does not react with the primer component(s) or the primer activator(s) contained within the respective chamber that is sealed with the seal. Such materials include, without limitation, plastics, rubbers, cellulose, starch, polymer-containing materials, etc.

Regarding the variations shown in FIGS. 5A-5D, the seal includes a frangible element or region, whereby pressure exerted on the seal will cause the frangible region of the seal to dislodge, rupture or otherwise sustain a breach that enables the contents of the chamber having such seal to be liberated to a predetermined degree from such chamber. The liberation of such material from such a chamber having such a seal facilitates the mixing of the primer component(s) with the primer activator(s) to produce an activated primer that is then ready to be dispensed to a substrate having a substrate surface. This variation further optionally contemplates the entire seal being made from a frangible material.

According to a variation of the present disclosure, the applicators disclosed allow for a controlled and precise direct application of a desired amount/volume of activated primer from a hand-held applicator to a substrate surface. If desired, the cap feature of the applicator can be engaged with the applicator body to protect the dispensing tip and to protect a user from inadvertently dispensing activated primer between intended uses. Therefore, according to an aspect of the present disclosure, the dispensing component or tip may contain and dispense activated primer by a wicking action, and that activated primer is only dispensed and applied to a substrate surface when the exposed dispensing component contacts a substrate surface. According to further contemplated variations, the applicator may be capped between uses, and the activated primer may be stored within the applicator between uses. According to a further aspect, the applicator may provide multiple applications of activated primer to substrate surfaces over time subject to the shelf life of the activated primer. According to further variations, the applicator may be designed only for a single use. The integral dispensing component or tip of the applicator obviates the need for separate application devices, such as, for example, brushes, etc., and that the applicator, via the integral dispensing component, dispenses activated primer directly and accurately to a substrate surface.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects as well as objects including, without limitation, manned and unmanned atmospheric and aerospace vehicles and other objects, and structures designed for use in space or other upper-atmosphere environments such as, for example, manned or unmanned vehicles and objects. Contemplated objects include, without limitation, vehicles such as, for example, manned and unmanned aircraft, spacecraft, rotorcraft, satellites, rockets, missiles, etc. and therefore include manned and unmanned aircraft, spacecraft, rotorcraft, terrestrial, non-terrestrial, and even surface and/or sub-surface water-borne vehicles and objects.

Figure 6:
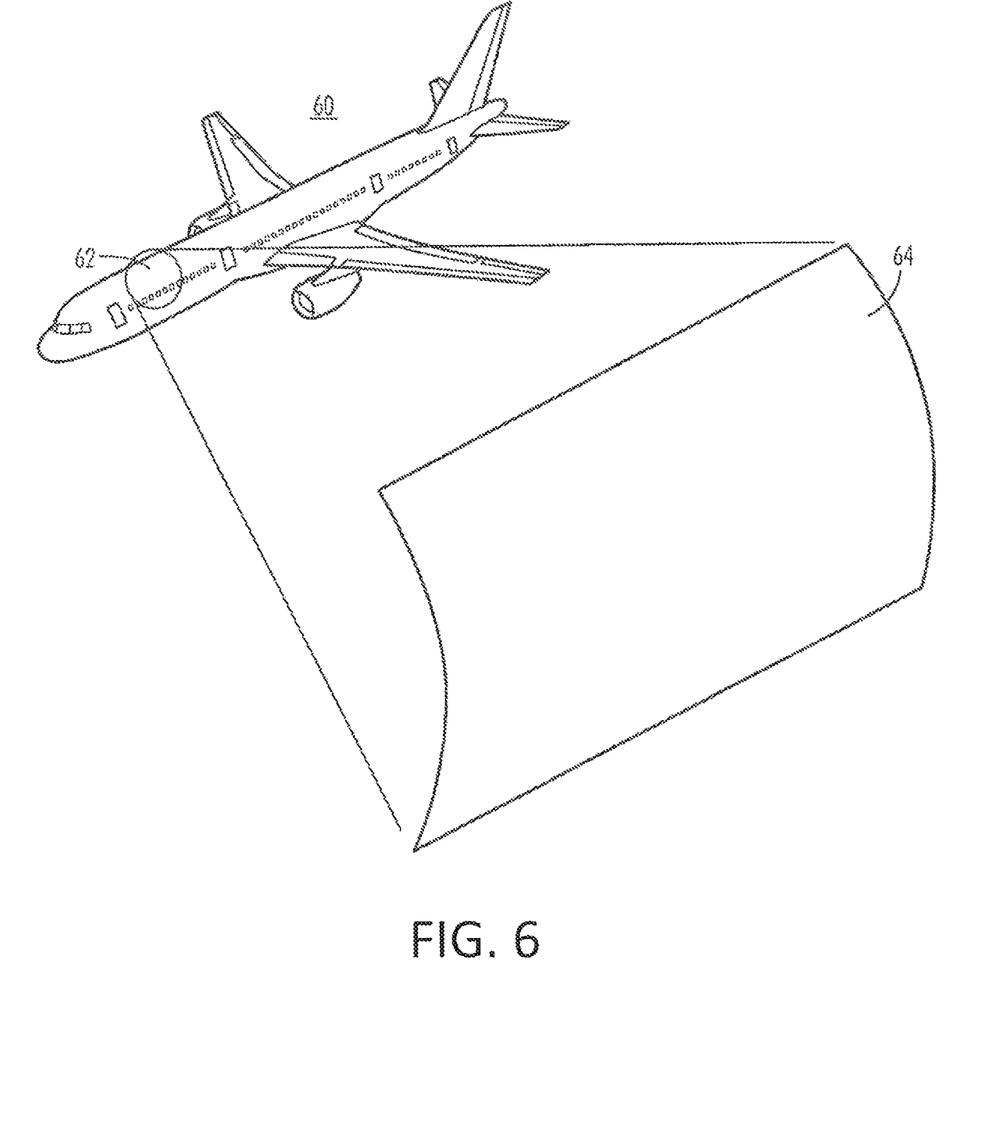
FIG. 6 is a perspective view of an aircraft showing an enlarged section of a panel comprising a panel surface, with at least a part of said for-panel surface comprising activated primer dispensed from an activated primer applicator disclosed herein.

FIG. 6 is a drawing of an aircraft 60 with a section 62 enlarged and showing a fuselage panel 64 comprising primed surfaces (not visible) primed according to the methods set forth herein using priming applicators disclosed herein.

Figure 7:
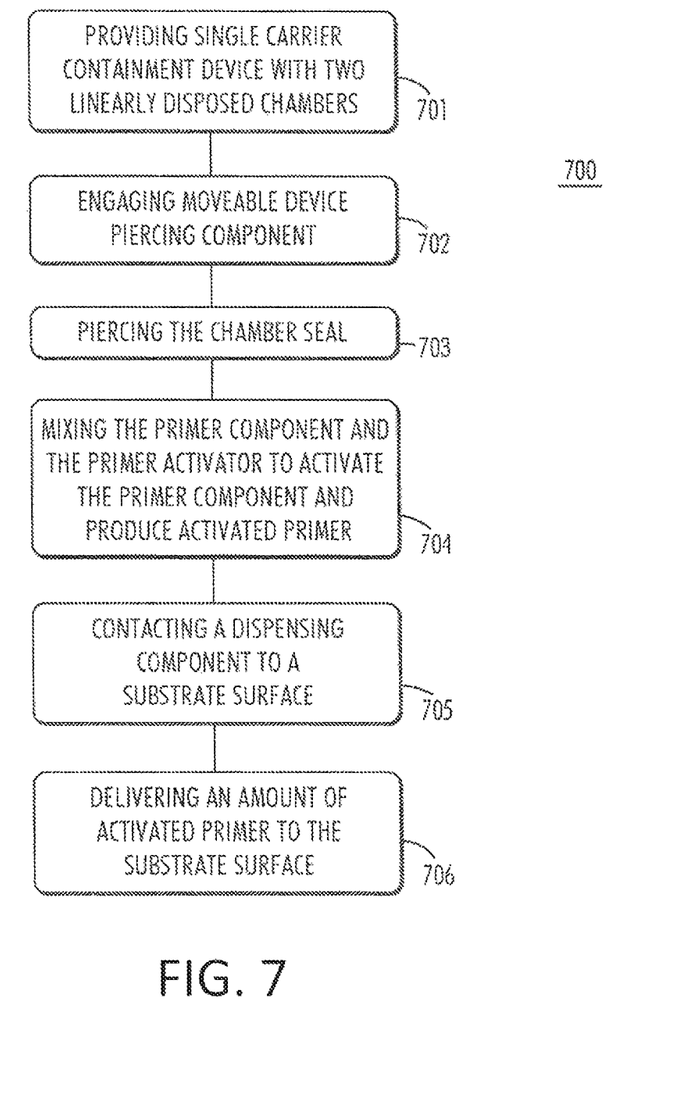
FIG. 7 is a flow chart according to an aspect of the present disclosure.
Figure 8A:
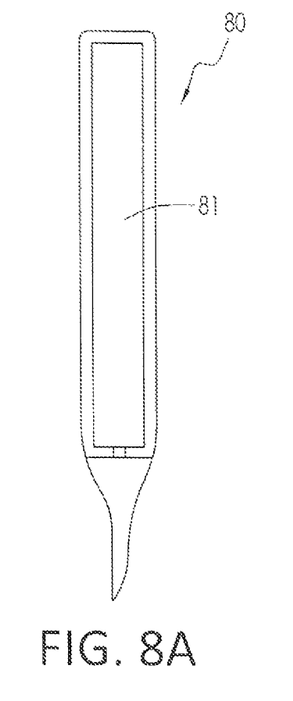
FIGS. 8A through 8E are representative views of primer applicator devices and components according to aspects of the present disclosure.
Figure 8B:
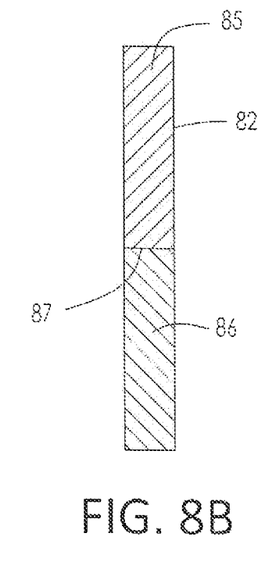
Figure 8C:
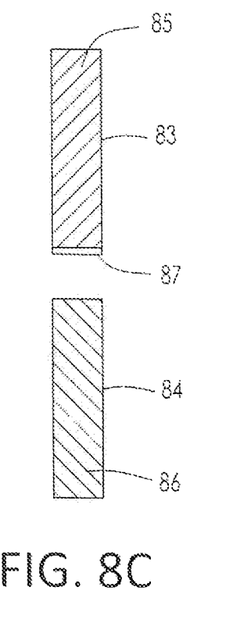
Figure 8D:
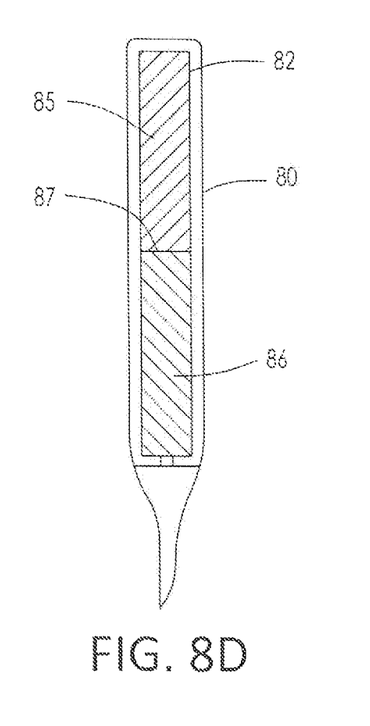
Figure 8E:
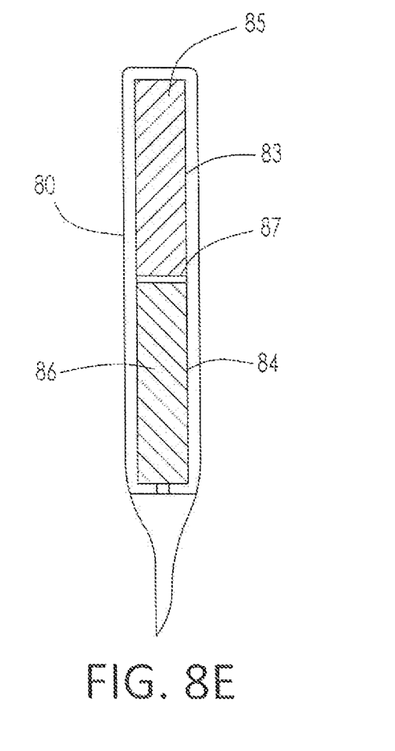

FIG. 7 is a flow chart outlining a method according to the present disclosure. According to method 700, a single barrel containment device is provided with two linearly disposed chambers 701. A movable device is engaged 702 to pierce a chamber seal 703. The primer component and primer activator contained, one each in the linearly disposed chamber, are mixed together activating the primer component and producing the activated primer, 704. The dispensing component of the containment device (applicator device) is brought into contact with a substrate surface 705 to deliver an amount of activated primer to the substrate surface 706.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

We claim:

1. An applicator comprising:
    a body comprising a barrel, said barrel comprising:
        a chamber dimensioned to receive a cartridge, said cartridge comprising:
            an amount of primer component;
            an amount of primer activator;
            a seal disposed between the primer component and the primer activator;
        wherein the cartridge is dimensioned to fit into the chamber; and
        wherein the amount of primer component and the amount of primer activator are positioned linearly to one another within the cartridge.

2. The applicator of claim 1, wherein the activator comprises at least one of: strontium chromate, butyl alcohol, acetone, deionized water, and combinations thereof.

3. The applicator of claim 1, wherein the primer component comprises at least one of: titanium dioxide, quartz, barium chromate, rutile, talc, bisphenol A diglycidal ether polymer, formaldehyde pmr with bis(aminoethyl) ethanediamine and phenol, unsaturated C18 fatty acids/tall oil acids/triethylenetetramine, and combinations thereof.

4. The applicator of claim 1, further comprising:
a dispensing component for dispensing activated primer from the applicator to a substrate surface.

5. The applicator of claim 1, further comprising:
a means for rupturing the seal to form activated primer within the cartridge.

6. The applicator of claim 1, wherein the applicator is a hand-held applicator.

7. The applicator of claim 4, wherein the dispensing component further comprises a wicking component.

8. The applicator of claim 5, wherein the means for rupturing the seal comprises a component movable with respect to the body.

9. The applicator of claim 5, wherein the means for rupturing the seal comprises a frangible element of the seal or a frangible region of the seal.

10. The applicator of claim 6, wherein the applicator is configured to dispense activated primer from the applicator to a substrate surface.

11. A vehicle comprising the substrate surface of claim 10.

12. A cartridge for a primer applicator, said cartridge comprising:
a primer component;
a primer activator;
a seal, said seal disposed between the primer component and the primer activator;
wherein the cartridge is dimensioned to fit into a primer applicator; and
wherein the amount of primer component and the amount of primer activator are positioned linearly to one another within the cartridge.

13. The cartridge of claim 12, wherein the activator comprises at least one of: strontium chromate, butyl alcohol, acetone, deionized water, and combinations thereof.

14. The cartridge of claim 12, wherein the primer component comprises at least one of: titanium dioxide, quartz, barium chromate, rutile, talc, bisphenol A diglycidal ether polymer, formaldehyde pmr with bis(aminoethyl) ethanediamine and phenol, unsaturated C18 fatty acids/tall oil acids/triethylenetetramine, and combinations thereof.

15. The cartridge of claim 12, wherein the cartridge is configured to receive a means for rupturing the seal, said means for rupturing the seal comprising a component movable with respect to the primer applicator.

16. The cartridge of claim 12, wherein the means for rupturing the seal comprises a frangible element of the seal or a frangible region of the seal.

17. The cartridge of claim 12, wherein the primer applicator is a hand-held primer applicator.

18. A method for delivering activated primer to a substrate surface, said method comprising:
engaging a movable seal piercing component of a reusable primer applicator, said reusable primer applicator comprising a barrel, said barrel comprising:
a chamber dimensioned to receive at least one cartridge;
at least one cartridge dimensioned to fit into the chamber, said cartridge comprising:
an amount of primer component;
an amount of primer activator;
a seal disposed between the primer component and the primer activator; and
a dispensing component for dispensing activated primer from the reusable primer applicator to a substrate surface;
rupturing the seal;
mixing the primer component and the primer activator within the cartridge to activate the primer component;
forming an activated primer;
contacting the dispensing component to a substrate surface; and
delivering an amount of the activated primer from the reusable primer applicator to the substrate surface.

19. The method of claim 18, said primer activator comprising at least one of: strontium chromate, butyl alcohol, acetone, deionized water and combinations thereof.

20. The method of claim 18 said primer component comprising at least one of: titanium dioxide, quartz, barium chromate, rutile, talc, bisphenol A diglycidal ether polymer, formaldehyde pmr with bis(aminoethyl) ethanediamine and phenol, unsaturated C18 fatty acids/tall oil acids/triethylenetetramine, and combinations thereof.

* * * * *